US010693178B2

(12) United States Patent
Kumar et al.

(10) Patent No.: US 10,693,178 B2
(45) Date of Patent: Jun. 23, 2020

(54) WEARABLE LITHIUM-SULFUR BATTERY AND METHODS OF MAKING THE SAME

(71) Applicants: Jitendra Kumar, Centerville, OH (US); Priyanka Bhattacharya, Beavercreek, OH (US); Guru Subramanyam, Dayton, OH (US)

(72) Inventors: Jitendra Kumar, Centerville, OH (US); Priyanka Bhattacharya, Beavercreek, OH (US); Guru Subramanyam, Dayton, OH (US)

(73) Assignee: UNIVERSITY OF DAYTON, Dayton, OH (US)

( * ) Notice: Subject to any disclaimer, the term of this patent is extended or adjusted under 35 U.S.C. 154(b) by 0 days.

(21) Appl. No.: 15/956,043

(22) Filed: Apr. 18, 2018

(65) Prior Publication Data
US 2018/0301741 A1 Oct. 18, 2018

Related U.S. Application Data

(60) Provisional application No. 62/486,510, filed on Apr. 18, 2017.

(51) Int. Cl.
*H01M 10/052* (2010.01)
*H01M 4/13* (2010.01)
(Continued)

(52) U.S. Cl.
CPC .......... *H01M 10/052* (2013.01); *H01M 4/13* (2013.01); *H01M 4/38* (2013.01); *H01M 4/382* (2013.01); *H01M 4/62* (2013.01); *H01M 4/622* (2013.01); *H01M 4/625* (2013.01); *H01M 4/626* (2013.01); *H01M 10/0436* (2013.01); *H01M 10/0562* (2013.01); *H01M 10/0565* (2013.01);
(Continued)

(58) Field of Classification Search
CPC ........... H01M 10/052; H01M 10/0436; H01M 10/0525; H01M 10/126; H01M 10/623; H01M 4/626; H01M 10/0565; H01M 4/382
See application file for complete search history.

(56) References Cited

U.S. PATENT DOCUMENTS 10,326,135 B2 * 6/2019 Fasching ............... H01M 4/582
2011/0287305 A1 * 11/2011 Scordilis-Kelley .........................
H01M 2/1653
429/163

(Continued)

OTHER PUBLICATIONS

Agostini, M. et al., "A lithium-sulfur battery using a solid, glass-type $P_2S_5$—$Li_2S$ electrolyte," Solid State Ionics, 224, pp. 48-51, 2013.

(Continued)

*Primary Examiner* — Stewart A Fraser
(74) *Attorney, Agent, or Firm* — Thompson Hine LLP (57) ABSTRACT

Lithium sulfur batteries are described, especially ones that are flexible for wearing about an appendage of a wearer. Such batteries have a lithium metal anode, a sulfur cathode comprising sulfur, a conductive carbon, a lithium supertonic solid-state conductor, and a dendritic or hyperbranched polymer binder, an electrolyte layer between the lithium metal anode and the sulfur cathode, and a current collector positioned on the sulfur cathode opposite the electrolyte layer.

17 Claims, 4 Drawing Sheets

(51) Int. Cl.
| | |
|---|---|
| H01M 4/62 | (2006.01) |
| H01M 10/0565 | (2010.01) |
| H01M 10/04 | (2006.01) |
| H01M 4/38 | (2006.01) |
| H01M 10/0562 | (2010.01) |
| H01M 4/66 | (2006.01) |
| H01M 4/134 | (2010.01) |
| H01M 4/02 | (2006.01) |

(52) U.S. Cl.
CPC ............ *H01M 4/134* (2013.01); *H01M 4/663* (2013.01); *H01M 2004/021* (2013.01); *H01M 2004/027* (2013.01); *H01M 2004/028* (2013.01); *H01M 2220/30* (2013.01); *H01M 2300/0068* (2013.01)

(56) References Cited

U.S. PATENT DOCUMENTS

2013/0280605 A1* 10/2013 Affinito ............... H01M 4/02
429/211
2016/0204408 A1* 7/2016 Herle ................. H01M 2/1686
429/143

OTHER PUBLICATIONS

Bhattacharya, P. et al., "Polyamidoamine dendrimer-based binders for high-loaded lithium-sulfur battery cathodes," Nano Energy, 19, pp. 176-186, 2016.
Jeong, S. et al., "Electrochemical properties of lithium sulfur cells using PEO polymer electrolytes prepared under three different mixing conditions," Journal of Power Sources, 174, pp. 745-750, 2007.
Kobayashi, T. et al., "All solid-sate battery with sulfur electrode and thio-LISICON electrolyte," Journal of Power Sources, 182, pp. 621-625, 2008.
Li, L. et al., "A Foldable Lithium-Sulfur Battery," ACS Nano, vol. 9, No. 11, pp. 11342-11350, 2015.
Nagao, M. et al., "All-solid-state Li-sulfur batteries with mesoporous electrode and thio-LISICON solid electrolyte," Journal of Power Sources, 222, pp. 237-242, 2013.
Nagata, H. and Chikusa, Y., "A lithium sulfur battery with high power density," Journal of Power Sources, 264, pp. 206-210, 2014.
Peng, H-J. et al., "3D Carbonaceous Current Collectors: The Origin of Enhanced Cycling Stability for High-Sulfur-Loading-Lithium-Sulfur Batteries," Advanced Functional Materials, 26, pp. 6351-6358, 2016.
Tao, Y. et al., "Lithium Superionic Conducting Oxysulfide Solid Electrolyte with Excellent Stability against Lithium Metal for All-Solid-State Cells," Journal of the Electrochemical Society, 163 (2), pp. A96-A101, 2016.
Wang, H. and Liang, C., poster for "High-Energy Lithium-Sulfur Batteries," Center for Nanophase Material Sciences, Oak Ridge National Laboratory, 1 page, 2014 http://www.sandia.gov/ess/docs/pr_conferences/2014/Thrusday/PosterSession8/07_Liang_Chengdu_ORNL_High-Energy_Lithium_Sulfur_poster.pdf.
Wang, Q. et al., "A gel-ceramic multi-layer electrolyte for long-life lithium sulfur batteries," Chem. Commun., 52, pp. 1637-1640, 2016.
Wang, Q. et al., "A shuttle effect free lithium sulfur battery based on a hybrid electrolyte," Phys. Chem. Chem. Phys., 16, pp. 21225-21229, 2014.
Wang, Q. et al., "Electronic and ionic co-conductive coating on the separator towards high-performance lithium-sulfur batteries," Journal of Power Sources, 306, pp. 347-353, 2016.
Yamada, T. et al., "All Solid-State Lithium-Sulfur Battery Using a Glass-Type $P_2S_5$—$Li_2S$ Electrolyte: Benefits on Anode Kinetics," Journal of The Electrochemical Society, 162(4), pp. A646-A651, 2015.
Yan, J. et al., "High-Performance Lithium-Sulfur Batteries with a Cost-Effective Carbon Paper Electrode and High Sulfur-Loading," Chem. Mater., 27, pp. 6394-6401, 2015.
Yu, X. et al., "Hybrid Lithium-Sulfur Batteries with a Solid Electrolyte Membrane and Lithium Polysulfide Catholyte," ACS Appl. Mater. & Interfaces, 7, pp. 16625-16631, 2015.
Zhang, Y. et al., "Three-dimensional carbon fiber as current collector for lithium/sulfur batteries," Ionics, 20, pp. 803-808, 2014.

* cited by examiner

WEARABLE LITHIUM-SULFUR BATTERY AND METHODS OF MAKING THE SAME

CROSS REFERENCE TO RELATED APPLICATIONS

This application claims the benefit of the filing date of U.S. Provisional Application No. 62/486,510, which was filed on Apr. 18, 2017. The contents of U.S. Application No. 62/486,510 are incorporated by reference in their entirety as part of this application.

STATEMENT REGARDING FEDERALLY SPONSORED RESEARCH OR DEVELOPMENT

This invention was made with U.S. Government support under the US Army STTR Phase I, Grant No. W56KGU-15-C-0005, and Spectral Energies, Grant No. SB1605-001-1. The U.S. Government may have certain rights in the invention.

TECHNICAL FIELD

The present invention relates to wearable, flexible lithium-sulfur (Li—S) batteries and, more particularly to Li—S batteries incorporating solid-state ceramic electrolytes wetted with liquid electrolyte (hybrid electrolytes), with composite cathodes including a ceramic electrolyte, and a lithium anode.

BACKGROUND

Lithium-sulfur (Li—S) batteries are regarded as one of the most promising candidates for next generation energy storage. One reason for this is that Li—S batteries have the potential to deliver at least twice the gravimetric energy density of lithium-ion batteries.

High specific energy and low cost flexible lithium-sulfur (Li—S) batteries have attracted significant attention to enable flexible and wearable electronic devices. One of the reasons for this is that sulfur is abundant and cheap, for use as the cathode in the Li—S batteries. Success of Li—S batteries depends on: (i) how to increase electron and ion conductivity of the sulfur cathode; (ii) how to stop sulfur migration, also known as polysulfide shuttling from cathode to anode; (iii) how to increase loading of sulfur in S-cathode; (iv) how to contain cathode volume changes during charge and discharge; and (v) how to incorporate solid electrolytes to mitigate dendrite related electrical safety issues in Li—S battery technology.

DETAILED DESCRIPTION

The following detailed description will illustrate the general principles of the invention, examples of which are illustrated in the accompanying drawings. In the drawings, like reference numbers indicate identical or functionally similar elements.

Figure 1:
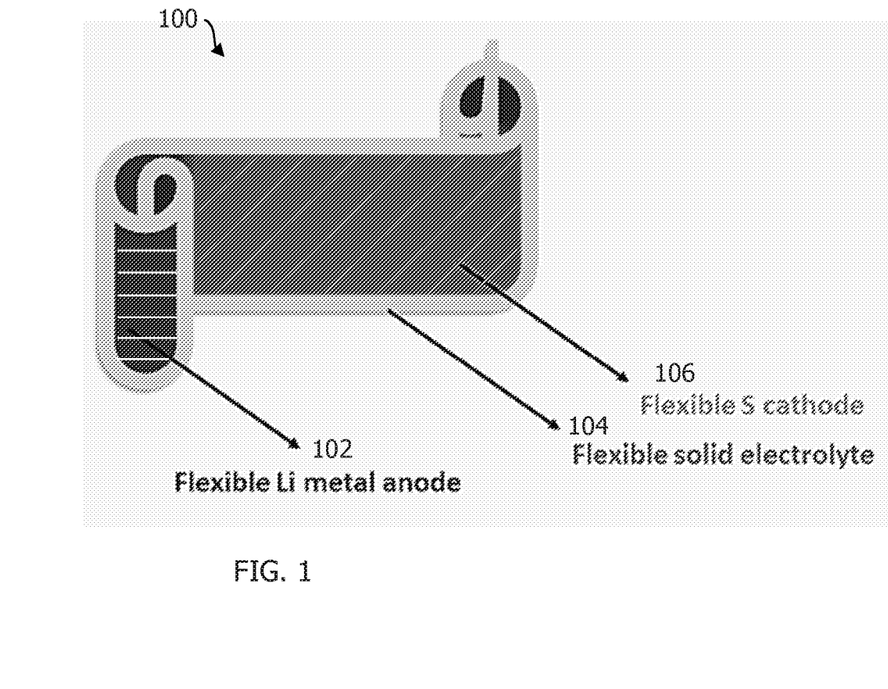
FIG. 1 is a perspective view of a partially rolled up flexible high performance Li—S battery.
Figure 2:
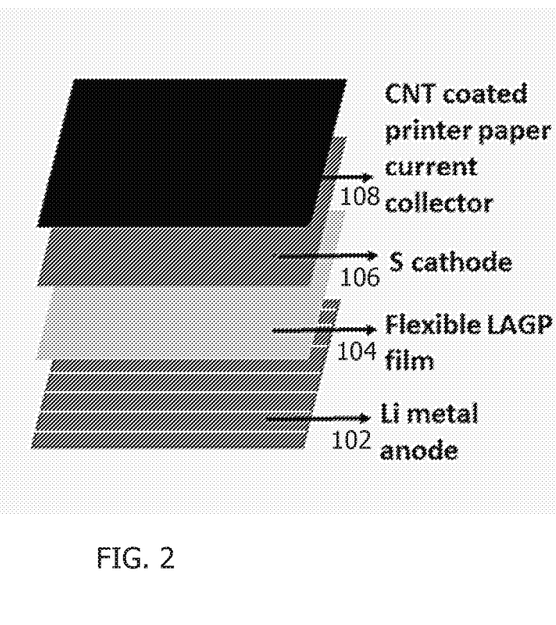
FIG. 2 is an exploded view of the layers or cell components of the Li—S battery of FIG. 1 with the addition of a carbon nanotube (CNT) coated printed paper current collector.

In all embodiments, lithium sulfur batteries that are flexible for wearing the battery about an appendage of wearers, such as about the wrist, forearm, bicep, ankle, leg, etc. are disclosed. Referring to FIGS. 1 and 2, the lithium sulfur batteries 100 have a lithium metal anode 102, a sulfur cathode 106 comprising sulfur, conducting carbon, a lithium superionic conductor, a dendritic or hyperbranched polymer binder, and an electrolyte layer 104 (also known as a separator) between the lithium metal anode and the sulfur cathode. Optionally, a current collector 108 is positioned on the sulfur cathode opposite of the electrolyte layer. As illustrated in FIG. 2, the bottom layer is the lithium (Li) metal anode 102. The layer immediately above the anode in direct contact with the anode is a flexible LAGP film 104, which is a glass-ceramic material. The next layer is the cathode 106, which is immediately above the flexible LAGP film, and top layer is the current collector.

Each layer of the battery must be flexible, as shown in FIG. 1, for the combination to form a wearable battery. The flexibility of the battery is determined by measuring the bending angle in degrees, which can be in a range of about 0° to about 180°.

The energy density of the wearable Li—S batteries disclosed herein may be 2 to 3 times greater than that of a solid state, lithium-ion battery, and these flexible, solid state cell designs provide leakage free, high energy, high power battery system that will have the highest possible thermal stability and durability.

Anode

The lithium anode comprises a lithium metal and/or a lithium alloy. The lithium metal anode has a thickness of about 5 μm to 100 μm, more preferably between 5 μm to 20 μm, and more preferably about 20 μm. Thin or thick lithium may also be protected from deleterious reaction with electrolytes by using earlier developed (Kumar et. al. UVD 0579 PA) artificial solid electrolyte interphase membrane interposed between the lithium anode and the separator. The artificial solid electrolyte interphase membrane may include a composite of a carbonaceous material, a high shear modulus conducting polymer, and a conductive additive.

Cathode

Conductive Carbon/Sulfur/Dendritic Polymer/Lithium-Ion Conducting Composite

The cathode formulation comprises a mixture of sulfur, a lithium superionic conductor, a conductive carbon, and a dendritic or a hyperbranched binder material. The conductive carbon, which may be in the form of a powder, enhances electron conduction. The conductive carbon may comprise acid washed powdered activated carbon, such as PWA activated carbon from Calgon Carbon Corporation, KETJENBLACK® black electroconductive carbon powder from AkzoNobel Polymer Chemistry, graphene, graphite, SUPER P® conductive carbon black from Imerys Graphite & Carbon Switzerland SA, carbon nanotubes, or combinations thereof. The conductivities of these carbon materials can range between 1 to 500 S/cm.

The lithium superionic conductor (LISICON) ceramic electrolyte is a three-dimensional $Li^{1+}$ ion conduction network, typically in a highly conductive crystalline phase, but is not limited thereto. Lithium aluminum germanium phosphate $Li_{1-x}Ge_{2-x}Al_xP_3O_{12}$ (LAGP) is preferred for use in the cathode formulation due to high environmental ruggedness and lower crystallization temperatures among other favorable traits, but other suitable LISICONs include lithium aluminum titanium phosphate $Li_{1+x}Ti_{2-x}Al_xP_3O_{12}$ (LATP), lithium electrolyte $Li_{10}GeP_2S_{12}$ (LGPS), or lithium electrolyte $Li_7La_6Zr_8O_{12}$ (LLZ). Each of these solid electrolytes may be used alone or in combination with LAGP or one another.

The structure of these LISICON solid electrolytes typically have a number of cavities and tunnels therein defining a mesoporous structure. The mesoporous structure is advantageous because the other components of the cathode may be infused, impregnated, or housed within the cavities and tunnels. In all aspects, the lithium superionic conductor may be present as particles (e.g., a powder) having an average particle size of less than 500 nm, and more preferably less than 200 nm as measured by electron microscopy.

In all aspects, the conductive carbon, which may be in the form of a powder, may be present as a carbonized coating on the LISICON, thereby forming a carbonized LISICON. The carbonized coating, after formation thereof, comprises a graphitic form of carbon and still has pores, cavities and tunnels.

The sulfur may be infused, impregnated, or housed within the pores, cavities, and tunnels of the carbonized LISICON. The weight ratio of sulfur to the carbonized LISICON is about 8:1 to about 1:1.

Polyamidoamine (PAMAM) dendrimers are hyper-branched polymers with unparalleled molecular uniformity, narrow molecular weight distribution, defined size, shape characteristics, and a multifunctional terminal surface. G4CMP dendrimers (MW=22,313.4 g), G4OH (MW=14,279), G4NH$_2$ (MW=14,215), G4SA (MW=20,615), G4OH (75%)-NH$_2$ (25%) (MW=14,215), and G4COONa (MW=12,931) are commercially available dendrimers. The surface groups of the dendrimers are hydroxyls, amines, carboxylates, acids, pyrrolidones, and combinations thereof. Generations of dendrimers can be between 2-5. Sulfur loading of the cathode compared to a cathode having PVDF instead of dendrimer polymer binder (all other components being equal) was about 3.7 times higher (measured in mg/cm$^2$ sulfur). The dendritic polymer binders improve the cathode performance by providing a higher sulfur loading and chemically bonding to the lithium polysulfides in order to mitigate the shuttle effect. They also provide better $Li^+$ diffusion and hence, better electrolyte wettability. As such, the Li—S batteries have enhanced cycle life with improved batter capacity and power.

Optionally, the cathode may also include multi-walled carbon nanotubes (MWCNTs) as about 1% to about 10% by weight thereof. In one aspect, the cathode contains between 1% to 5% by weight MWCNTs therein. The addition of multi-walled carbon nanotubes to the cathode results in conducting carbon (typically in the form of graphene), which enhances electron conduction. The MWCNTs also provide better electrolyte wettability by dispersing the carbon/sulfur composite and providing a long-range (few nanometer to few micron) $Li^+$ conduction pathway, whereas carbon particles provide short range (only a few nanometers) $Li^+$ conduction pathway.

Electrolyte Layer

The electrolyte layer (also known as a separator) is a solid thin film layer comprising a lithium superionic conductor structure for $Li^{1+}$ transport. In one aspect, the electrolyte layer may be made of the same lithium superionic conductor material present in the cathode, but of course may be different. This layer (separator) of the Li—S battery has a thickness of about 10 µm to 30 µm, more preferably about 20 µm. The solid thin film separator may be a composite polymer consisting of polypropylene, polyethylene, polyamides and polyimides, for example a CELGARD® separator that is coated with a LISICON and soaked in liquid electrolyte. The solid thin film layer may be a composite of $Li^{1+}$ conducting polymers consisting of polyethylene oxide/Li-salt, copolymer (poly(vinylidene fluoride-co-hexafluoropropylene) (PVdF-HFP), poly(methyl methacrylate) (PMMA)/Li-salt), etc. that is made composite with LISICON.

In some embodiments, the electrolyte layer is surrounded by a liquid electrolyte solution. One suitable electrolyte solution is a 1M LiTFSI/0.1M LiNO$_3$/DOL:DME (1:1-v:v). However, one goal of the disclosed Li—S batteries is to use as little liquid electrolyte, and in some embodiments no liquid electrolyte. In one aspect, the reduction in the amount of liquid electrolyte used can be as low as 50% by volume or by weight to 80% by volume or by weight.

Current Collector

The current collector comprises carbon nanotube coated cellulose-based paper. A standard sheet of paper for use in any printer or photocopier is suitable here. Other cellulose-papers of thickness ranging between 50 nm to 50 µm are also suitable. This type of current collector is lighter and/or cheaper than a metal (e.g., aluminum) current collector. It also provides a three-dimensional electron conduction pathway due to its porous structure. In one embodiment, the carbon nanotube coated paper comprises nitrogen functionalized single walled carbon nanotubes. In one embodiment, the carbon nanotubes were octadecylamine functionalized single walled carbon nanotubes. Other than printer paper, a porous filter paper, weighing paper, fiber-glass paper, and others with similar characteristics thereto coated with octadecylamine functionalized single walled carbon nanotubes can be used as the current collector.

The nitrogen functionalities thereof chemically bond with lithium polysulfides, preventing polysulfide dissolution in the electrolyte and hence, the shuttle effect. These current collectors are porous, which increases the sulfur cathode specific area and provides better accessibility for electrolyte for proper wettability (electrolyte/cathode interfacing). As a result of these beneficial properties, high cathode loading per unit area occurs, which increases the battery energy density.

Methods of Making

Cathode

In some embodiments, a mechanical-thermal process is provided for sulfur encapsulation by a LISICON-conducting carbon three dimensional (3D) matrix. In one embodiment, the LISICON is prepared by mixing and grinding stoichiometric amounts of the components thereof defining the LISICON, followed by heating to a temperature of 1350° C. to form a glass which is then subsequently crystallized at about 750 to 850° C. to transform it into a glass-ceramic powder.

In another embodiment, a sol-gel method is used to make the LISICON. For example, to make LAGP by the sol-gel method, stoichiometric amounts of lithium nitrate (aqueous, denoted as "aq"), aluminum nitrate (aq), germanium chloride (in ethanol), and ammonium dihydrogen phosphate (aq) were added to citric acid dissolved in DI-$H_2O$ in a beaker, and stirred at 80° C. for 30 min in ambient conditions. Then, ethylene glycol was added and the mixture was stirred for 30 minutes. The temperature of the solution was slowly raised to 180° C., and stirred for six hours. The temperature of the solution was further slowly raised to 250° C. to obtain a brown precipitate.

Here, the brown precipitate is further treated to form a carbon coating thereon, resulting in a carbonized LISICON. The brown precipitate was transferred to a quartz tube and pyrolized in argon atmosphere at a temperature as high as 500° C. A black hydrocarbon residue was formed. The resulting precipitate was ball-milled for 30 min and transferred back to a quartz tube in a high temperature furnace and calcined at 850° C. for 12 hours. The resulting black powder was ball-milled for 10 hours to obtain fine carbon-coated LAGP powder having an average primary particle size below 200 nm.

Next, the sulfur is added to the LISICON material to form the cathode. 50 wt % of sulfur to 50 wt % of the carbon-coated LAGP was milled together. This mixture was then heated to 155° C. by ramping up the temperature 5° C./min. Once at 155° C., the temperature was maintained for 12 hours to melt-diffuse the sulfur into the pores of the carbon-coated LAGP, thereby forming a composite cathode.

Optionally, to this composite cathode, carbon nanotubes may be added. For example, in one embodiment, 5 wt % of multi-walled carbon nanotubes were added to the composite cathode (S-carbon-coated LAGP) and milled. Then, a slurry was formed therewith by addition of 5 wt % aqueous dendritic or hyperbranched polymer binder. As a result, the composite cathode is coated with the carbon nanotubes. This slurry was coated or cast on to an aluminum foil to make the final cathode.

Optionally, a composite cathode comprising carbon materials identified above (10-20 wt %), sulfur (60-80 wt %), with/without dendrimer binders (5-10 wt %), and LISICON (10-50 wt %) can be fabricated. The current collector can be an aluminum foil or CNT-coated cellulose-based paper.

Electrolyte Layer

A three-layered (ceramic-polymer-ceramic) hybrid separator was prepared by coating ceramic electrolyte [lithium aluminum germanium phosphate (LAGP)] over both sides of polyethylene (PE) polymer membrane using electron beam physical vapor deposition (EB-PVD) technique (Kumar et. al. Journal of Power Sources 301 (2016) 194-198, Kumar et. al. PA UD613). The EB-PVD system has a multi-hearth high power electron beam source capable of evaporating most metals and ceramics at a fast rate. In this process, electrolyte material (LAGP) was placed in a graphite crucible. The cleaned substrate (PE) was mounted on a metal plate. The chamber was evacuated to a base pressure of <$10^{-6}$ Torr. A deposition rate of 1.0-1.5 nm per/second was used to deposit ~130 nm LAGP film on one side of PE separator and then on the other side. The deposition parameters can be manipulated to obtain LAGP film of desired thickness, density/porosity. Thickness of LAGP layer can vary from 100 nm to 5 micron. Thickness of PE separator can vary from 10 micron to 25 micron.

Current Collector

Carbon nanotubes, in particular SWCNTs, were dispersed in an organic solvent, drop-casted on to 8.5×11 sheet of regular printer paper, and dried, for example at 80° C. overnight. The carbon nanotubes have nitrogen functionalities as discussed above. The organic solvent includes one or more of chloroform, dichlorobenzene, tetrahydrofuran, and toluene. Other current collectors, such as a porous filter paper, weighing paper, or others disclosed above, were prepared by coating said paper with SWCNTs.

Li—S battery

Each of the components of the Li—S battery discussed above are layered as shown in FIGS. 1 and 2 and are contained in a commercially available cell casing. In one embodiment, the cell casing may be coin shaped and result in a coin cell for testing the performance of the battery. However, it is more desirable for the flexible Li—S batteries disclosed herein to be elongated flat pouch cells that are incorporated into wearable electronic devices that may be wrapped about an appendage of the wearer, as described herein.

WORKING EXAMPLES

Example 1

Four lithium sulfur (Li—S) coin cells incorporating the following were made and tested to evaluate the first discharge capacities of each. Each coin cell had a cathode comprised 85 wt % (sulfur (60 wt %)—graphite (20 wt %)—LAGP (20 wt %)), 10 wt % dendrimer binder (PAMAM-G4OH), and 5 wt % MWCNT, liquid electrolyte 1M LiTFSI|0.1M $LiNO_3$|DOL:DME (1:1-v:v), a CELGARD® (25 μm) separator, and a Li metal foil anode. The sulfur loading in each cathode was between 1 to 2.5 mg/$cm^2$. The current collector (CC), however, was different in the four coin cells. One had an aluminum (Al) current collector. The second had printer paper (PP) coated with nitrogen functionalized SWCNTs as the current collector. The third had weighing paper (WP) coated with nitrogen functionalized SWCNTs as the current collector. The fourth had WHATMAN® filter paper (FP) coated with nitrogen functionalized SWCNTs as the current collector.

Figure 3:
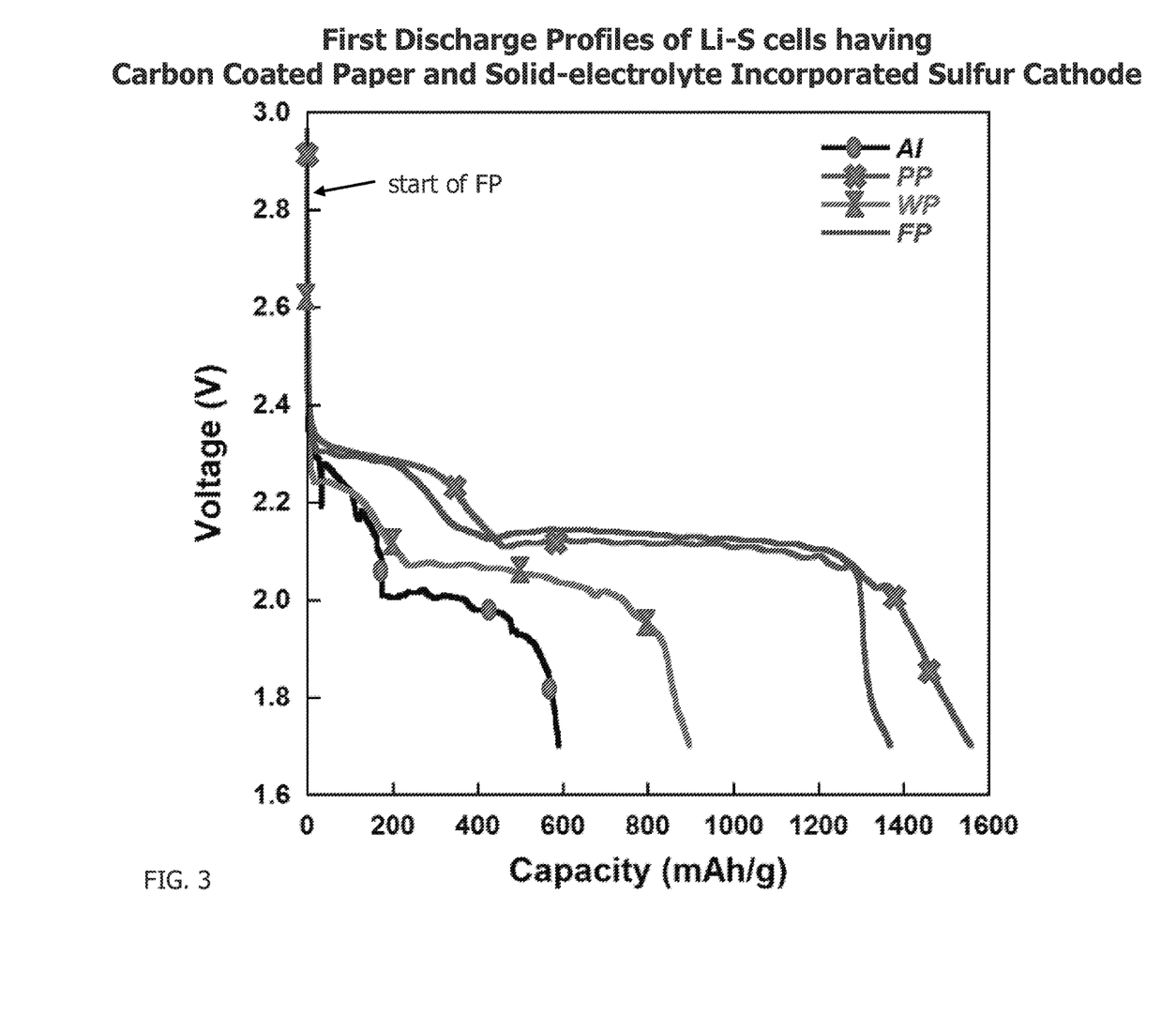
FIG. 3 is a graph of first discharge profiles of Li—S cells incorporating carbon-coated papers based current collector and solid-electrolyte incorporated S cathodes.

As can be seen from FIG. 3, the printer paper based current collector gave the highest discharge capacity, greater than 2.5 times better than a conventional Al current collector. The S loading was also higher on the paper-based current collectors (greater than 2 mg/$cm^2$).

Example 2

Two Li—S coin cells were prepared to compare the effect of the presence of a LISICON in the cathode. The cathodes were the same other than one had LAGP present as 20 wt % thereof and the other had no LAGP present. The cathodes included 90 wt % (sulfur (60 or 70 wt %)—graphite (20 or 30 wt %)—LAGP (20 wt % if present), 5 wt % of a PVDF binder, and 5 wt % of MWCNT. The S loading in the cathodes was greater than 2 mg/$cm^2$. The coin cells were same with respect to having an aluminum current collector, a liquid electrolyte 1M LiTFS|0.1M $LiNO_3$|DOL:DME (1:1-v:v), a CELGARD® (25 μm) separator, and a Li metal foil anode.

Figure 4:
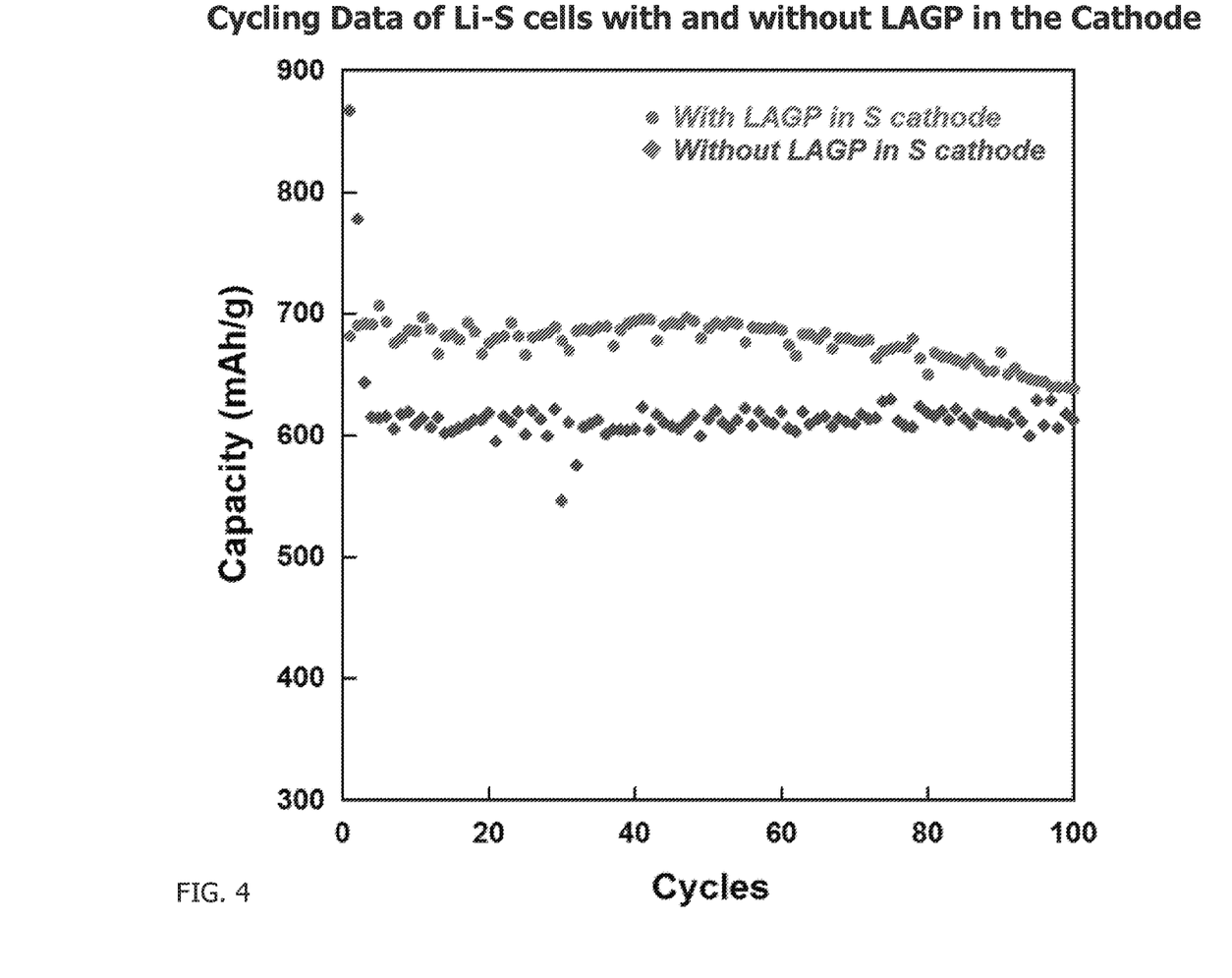
FIG. 4 is a graph of cycling data of Li—S cells with and without Lithium aluminum germanium phosphate (LAGP) in the cathode.

As shown in FIG. 4, the capacity of the Li—S coin cell that included LAGP incorporated in the cathode is 1.4 times better (92% capacity retention after 100 cycles) than the cell without LAGP in the cathode.

Example 3

Two Li—S coin cells were made that had a lithium metal foil anode, a liquid electrolyte 1M LiTFS|0.1M $LiNO_3$|DOL:DME (1:1-v:v), and a carbon foam current collector with 0.5 M $Li_2S_6$ catholyte as the cathode. One coin cell had a CELGARD® (25 μm) separator and the other had a CELGARD® (25 μm) separator that was coated with LAGP on both sides.

Figure 5:
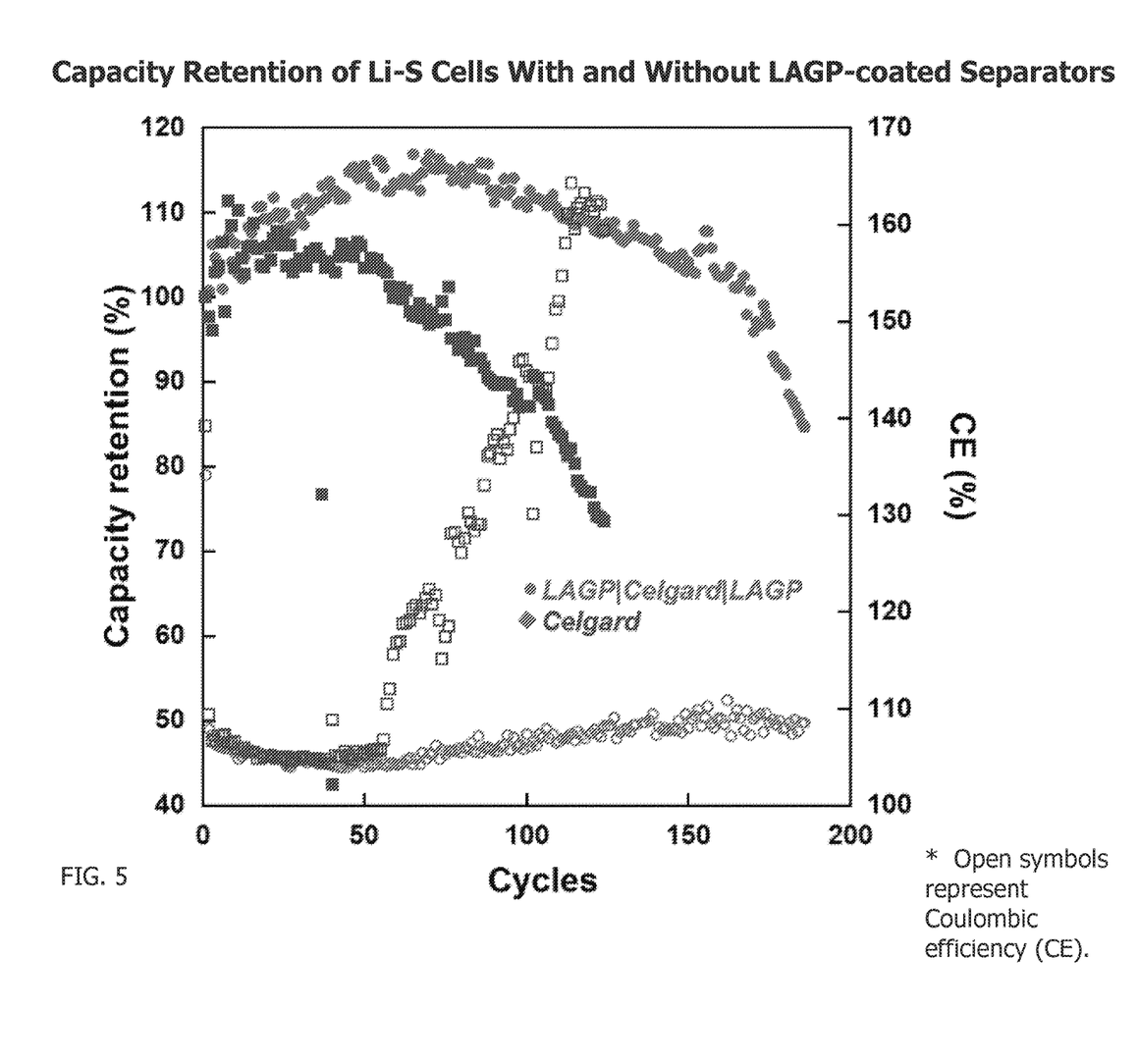
FIG. 5 is a graph of capacity retention of Li—S cells with and without LAGP-coated separators.

FIG. 5 shows the cycling profiles of these two Li—S coin cells. The data shows that the LAGP-coated CELGARD® separator had a higher capacity retention (greater than 100% for more than 170 cycles) compared to the coin cell that had an un-modified CELGARD® separator (less than 100% in 65 cycles).

It is noted that terms like "preferably," "commonly," and "typically" are not utilized herein to limit the scope of the appended claims or to imply that certain features are critical, essential, or even important to the structure or function of the claimed subject matter. Rather, these terms are merely intended to highlight alternative or additional features that may or may not be utilized in a particular embodiment.

Although the invention is shown and described with respect to certain embodiments, it is obvious that modifications will occur to those skilled in the art upon reading and understanding the specification, and the present invention includes all such modifications.

What is claimed is:

1. A lithium sulfur battery comprising:
   a lithium metal anode;
   a sulfur cathode comprising sulfur infused into the cavities of, a lithium superionic conductor conformally coated with conductive carbon;
   an electrolyte layer comprising a lithium superionic conductor; and
   a porous, flexible current collector;
   wherein the electrolyte layer is between the lithium metal anode and the sulfur cathode;
   wherein on the sulfur cathode is between the current collector and the electrolyte layer; and
   wherein the battery is flexible such that it can be partially rolled up or wrapped about an appendage of a wearer.

2. The lithium sulfur battery of claim 1, wherein the lithium metal anode has a thickness of about 5 μm to 100 μm.

3. The lithium sulfur battery of claim 1, wherein the lithium superionic conductor in the sulfur cathode is $Li_{1+x}Ge_{2-x}Al_xP_3O_{12}$ (LAGP), lithium aluminum titanium phosphate (LATP), lithium electrolyte $Li_{10}GeP_2S_{12}$ (LGPS), lithium electrolyte $Li_7La_6Zr_8O_{12}$ (LLZ), or combinations thereof.

4. The lithium sulfur battery of claim 1, wherein the conductive carbon is present as a carbonized coating on the lithium superionic conductor (LISICON), thereby forming a carbonized LISICON.

5. The lithium sulfur battery of claim 4, wherein the lithium superionic conductor in the sulfur cathode is $Li^{1+}_xGe^{2-}_yAl_yP_3O_{12}$(LAGP), lithium aluminum titanium phosphate (LATP), lithium electrolyte $Li_{10}GeP_2S_{12}$ (LGPS), lithium electrolyte $Li_7La_6Zr_8O_{12}$ (LLZ), or combinations thereof.

6. The lithium sulfur battery of claim 4, wherein the carbonized coating comprises a graphitic, carbon nanotube form of carbon and has pores.

7. The lithium sulfur battery of claim 4, wherein the lithium superionic conductor are particles that have an average particle size of less than 500 nm.

8. The lithium sulfur battery of claim 4, wherein the sulfur is infused in the pores of the carbonized LISICON.

9. The lithium sulfur battery of claim 8, wherein the cathode comprises a ratio of sulfur to the carbonized LISICON of about 8:1 to about 1:1.

10. The lithium sulfur battery of claim 8, wherein the cathode further comprising multi-walled carbon nanotubes as about 1% to about 10% by weight thereof.

11. The lithium sulfur battery of claim 1, wherein the sulfur cathode further comprises a dendritic or hyperbranched polymer binder.

12. The lithium sulfur battery of claim 1, wherein the electrolyte layer is a solid film layer comprising a lithium superionic conductor structure.

13. The lithium sulfur battery of claim 12, wherein the electrolyte layer comprises the same lithium superionic conductor material as the cathode.

14. The lithium sulfur battery of claim 12, wherein the electrolyte layer has a thickness of about 10 μm to about 30 μm.

15. The lithium sulfur battery of claim 12, wherein the electrolyte layer is surrounded by a liquid electrolyte solution.

16. The lithium sulfur battery of claim 1, wherein the current collector comprises carbon nanotube coated paper.

17. The lithium sulfur battery of claim 16, wherein the carbon nanotube coated paper comprises nitrogen functionalized single walled carbon nanotubes.

* * * * *

UNITED STATES PATENT AND TRADEMARK OFFICE
CERTIFICATE OF CORRECTION

PATENT NO.         : 10,693,178 B2
APPLICATION NO.    : 15/956043
DATED              : June 23, 2020
INVENTOR(S)        : Jitendra Kumar et al.

Page 1 of 1

It is certified that error appears in the above-identified patent and that said Letters Patent is hereby corrected as shown below:

In the Claims

Column 7, Line 33, Claim 1 reads:
"wherein on the sulfur cathode is between the current"
It should read:
--wherein the sulfur cathode is between the current--

Signed and Sealed this
Fourth Day of August, 2020

Andrei Iancu
*Director of the United States Patent and Trademark Office*